United States Patent
Kim et al.

(10) Patent No.: US 6,483,313 B1
(45) Date of Patent: Nov. 19, 2002

(54) METHOD AND APPARATUS FOR MEASURING CONVERGENCE WITH RESPECT TO A COLOR CRT USING A COLOR CCD CAMERA

(75) Inventors: Wan-Soo Kim, Seoul (KR); Chang-Gun Lee, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/629,856

(22) Filed: Aug. 1, 2000

(30) Foreign Application Priority Data

Jan. 29, 2000 (KR) .......................................... 2000-4460

(51) Int. Cl.[7] .............................................. G01R 31/24
(52) U.S. Cl. ................... 324/404; 315/368.11; 348/807
(58) Field of Search ..................... 315/368.11, 368.12, 315/368.18; 348/189, 191, 182, 190, 807; 324/404; 445/3, 63

(56) References Cited

U.S. PATENT DOCUMENTS

| | | | |
|---|---|---|---|
| 4,480,264 A | * 10/1984 | Duschl | 348/189 |
| 4,593,309 A | * 6/1986 | Uno et al. | 348/191 |
| 4,635,095 A | * 1/1987 | Legrand et al. | 348/191 |
| 4,686,429 A | * 8/1987 | Fendley | 315/368.12 |
| 4,925,420 A | * 5/1990 | Fourche et al. | 445/3 |
| 5,028,849 A | * 7/1991 | Kawakami et al. | 315/368.11 |
| 5,049,791 A | * 9/1991 | Kawakami | 315/368.11 |
| 5,077,600 A | * 12/1991 | Ichigaya et al. | 348/182 |
| 5,536,192 A | * 7/1996 | Byun | 445/3 |
| 5,905,820 A | * 5/1999 | Cushman et al. | 358/429 |

FOREIGN PATENT DOCUMENTS

| | | |
|---|---|---|
| JP | 6-022348 | 1/1994 |
| JP | 10-074456 | 3/1998 |

* cited by examiner

Primary Examiner—N. Le
Assistant Examiner—Vincent Q. Nguyen
(74) Attorney, Agent, or Firm—Larson & Taylor, PLC

(57) ABSTRACT

An apparatus and method are provided for measuring convergence of the Red-Green-Blue (R.G.B.) signals of a color cathode ray tube (CRT) using a color charge coupled device (CCD) camera. A uniform R.G.B. brightness value is picked up by the color CCD camera at all positions of the CRT screen when the color CCD camera images the screen, thus enabling convergence to be more accurately measured and adjusted. Test patterns having a constant R.G.B. brightness value are displayed on the screen of the CRT by a pattern generator. The displayed test patterns are picked up by the color CCD camera, and when the R.G.B. brightness values differ from a corresponding reference brightness value, a controller adjusts the intensity of each of the R.G.B. signals of each test pattern by suitably controlling the pattern generator. A uniform R.G.B. brightness value is thus provided for all test patterns displayed on the CRT screen. Only after the R.G.B. brightness value has been made uniform is convergence measured, thereby increasing the reliability of the convergence measurement data.

4 Claims, 5 Drawing Sheets

$d_1 \neq d_2 \neq d_3 \neq d_4 \neq d_5$

METHOD AND APPARATUS FOR MEASURING CONVERGENCE WITH RESPECT TO A COLOR CRT USING A COLOR CCD CAMERA

BACKGROUND OF THE INVENTION

1. Field of the Invention

The present invention relates to a method and apparatus for measuring convergence with respect to a color cathode ray tube (CRT). More particularly, the invention relates to a method and apparatus for measuring convergence of the Red, Green and Blue (R.G.B.) beams of a color CRT by using a color charge coupled device (CCD) camera wherein the image of the color CRT picked up by the camera has a uniform R.G.B brightness value at all positions of the color CRT screen so as to enable convergence to be more accurately measured and adjusted.

2. Description of the Related Art

Generally, in order to display an image in perfect color on the screen of a color CRT used as a display device, such as a color TV or a color monitor, three electron beams, i.e., a three color (Red, Green, and Blue) electron beam, (hereinafter referred to as R.G.B beam) generated from three corresponding electron guns, must be concentrated at a single pixel point of CRT screen with different incidence angles. This concentration of the three electron beams is referred to as convergence alignment. In general, convergence is defined as a condition in which the electron beams (R.G.B.) of a CRT intersect at a specified point.

There are two kinds of convergence, i.e., static convergence and dynamic convergence. Static convergence refers to control of total misconvergence by adjusting the concentration of the R.G.B beam in the vicinity of a central part of the CRT screen, and dynamic convergence concerns adjustment of the concentration of the R.G.B beam in the vicinity of a peripheral part of the screen. Therefore, in a conventional color CRT, the horizontal deviation magnetic field produced by the deviation yoke mounted between the three electron guns and the screen should be a strong "pincushion-type" magnetic field, while the vertical deviation magnetic field should be a strong "barrel-type" magnetic field. Each direction of progression of the three (R.G.B) beams is varied by the horizontal and vertical magnetic fields, so that the three (R.G.B) beams are properly concentrated on the screen.

Misconvergence among the three R.G.B beams generated by the electron gun of CRT can occur because of defects in the deviation yoke and/or CRT, or because of errors associated with a mechanical mechanism or the curvature of the CRT screen. Therefore, when one or more of these causes the three R.G.B beams to deviate from one another and not properly converge, a color deviation occurs.

In the system of the prior art, in order to measure convergence of the R.G.B. beams of color CRT, a large number of optical sensors are mounted on the color CRT. Because convergence is measured with respect to each of the positions at which the optical sensors are mounted, convergence cannot be always measured at a particular position desired by the user. Further, the positions of the optical sensors are changed according to the screen size of the color CRT, so that the time required in making convergence measurements is increased. Moreover, it is difficult to change a completed product model the convergence of which is to be tested.

To solve the problems discussed above with respect to convergence measuring systems using optical sensors, another type of convergence measuring system has been developed which employs a color CCD camera. Such a system is shown in FIG. 1, wherein a color CCD camera 14 is shown which produces images of the patterns on the screen of a CRT 10. Such a convergence measuring device can measure convergence at a desired position irrespective of a screen size, but with such a system there is a difference among R (red), G (green), B (blue) brightness values because of the different distances, indicated at d1–d5 in FIG. 1, between patterns. More specifically, R.G.B brightness values for a pattern in the vicinity of the center of the screen are relatively high, while R.G.B brightness values for a pattern at a peripheral part of the screen are a relatively low.

Such a difference in the R.G.B brightness values result in convergence measurement errors, and to accommodate for this, the prior art adjusts the gain of the color CCD camera or the iris of a lens. The prior method of adjusting the lens iris or camera gain can result in simultaneously brightening the center part and peripheral part of the screen or in simultaneously darkening these parts. It will be understood that in order to provide uniform R.G.B brightness values, the brightness of a relatively bright screen part image should preferably be lowered, and the brightness of a relatively dark screen part image should preferably be raised. However, the prior art cannot provide this differentiation with respect to lowering and raising brightness level, but instead simply increases all of the brightness values of all patterns at the same time, or reduces the brightness of all such patterns at the same time. As a result, if the image of a test pattern picked up by the CCD camera is overly dark, the output signal of the color CCD camera is very sensitive to noise, whereas if the image of test pattern is overly bright, the output signal of the color CCD camera is saturated, making it difficult to discriminate the output signal, and thereby lowering the reliability of the convergence measurement data.

SUMMARY OF THE INVENTION

The present invention is directed to an apparatus and method for measuring convergence of the R.G.B. beams of a color CRT which overcomes the problems discussed above.

It is an object of the present invention to provide an apparatus and method for measuring convergence with respect to a color CRT wherein a uniform R.G.B brightness value is provided at all positions of the color CRT screen when a color CCD camera images the color CRT, so that convergence can be more accurately measured and adjusted.

In order to achieve this object, an apparatus is provided for measuring convergence of R.G.B. beams of a color CRT, the apparatus comprising: a pattern generator for generating a test pattern of R.G.B. signals on a screen of a color CRT; a color CCD camera for imaging the test pattern formed on the screen of the color CRT to produce an imaged test pattern; a comparator for comparing R.G.B brightness values of the imaged test pattern of the color CCD camera with a predetermined reference brightness value; and a controller for adjusting, in intensity, each of the R.G.B signals of the test pattern generated by the pattern generator so as to produce a uniform R.G.B brightness value when the R.G.B brightness values of the imaged test pattern are determined by said comparator to be different from said reference brightness value, and for, thereafter, measuring convergence.

Preferably, the controller controls the pattern generator so as to adjust the intensity of the R.G.B signals of each test pattern in order to produce a uniform R.G.B brightness value for all test patterns.

Preferably, each test pattern contacts a crossing point of an overall cross-hatch pattern, is positioned within a respective discrete area defined by crossing lines of the cross-hatch pattern, and is of a square shape.

Advantageously, the reference brightness value is within a level range from "150" to "240" that divides the R.G.B signals, in a grey level range from "0" to "255."

In accordance with a further aspect of the invention, a method is provided for measuring convergence R.G.B. signals of a color CRT, the method comprising the steps of: generating a plurality of test patterns on a screen of the color CRT each having a constant R.G.B brightness value; imaging the test pattern formed on the screen of the color CRT using a color CCD camera to produce an imaged test pattern; and adjusting in intensity each of the R.G.B signals of the test pattern on the basis of the R.G.B brightness values of the imaged test pattern produced by the color CCD camera, and thereafter measuring convergence.

Preferably, the adjusting in intensity of the R.G.B signals comprises comparing R.G.B brightness values of the imaged test pattern with a predetermined reference brightness value, and adjusting in intensity the R.G.B signal of each pattern so as to produce a uniform R.G.B brightness value for all test patterns.

Preferably, as above, each test pattern contacts a crossing point of an overall cross-hatch pattern, is positioned within a discrete area defined by crossing lines of the cross-hatch pattern, and is of a square shape.

Advantageously, as above, the reference brightness value is within a level range from "150" to "240" that divides the R.G.B signals, in a grey level range from "0" to "255."

BRIEF DESCRIPTION OF THE DRAWINGS

Further objects and other advantages of the present invention will be set forth in, or will become apparent from, the following description of preferred embodiments of the invention, taken in conjunction with the attached drawings, in which.

DETAILED DESCRIPTION OF THE PREFERRED EMBODIMENTS

Figure 2:
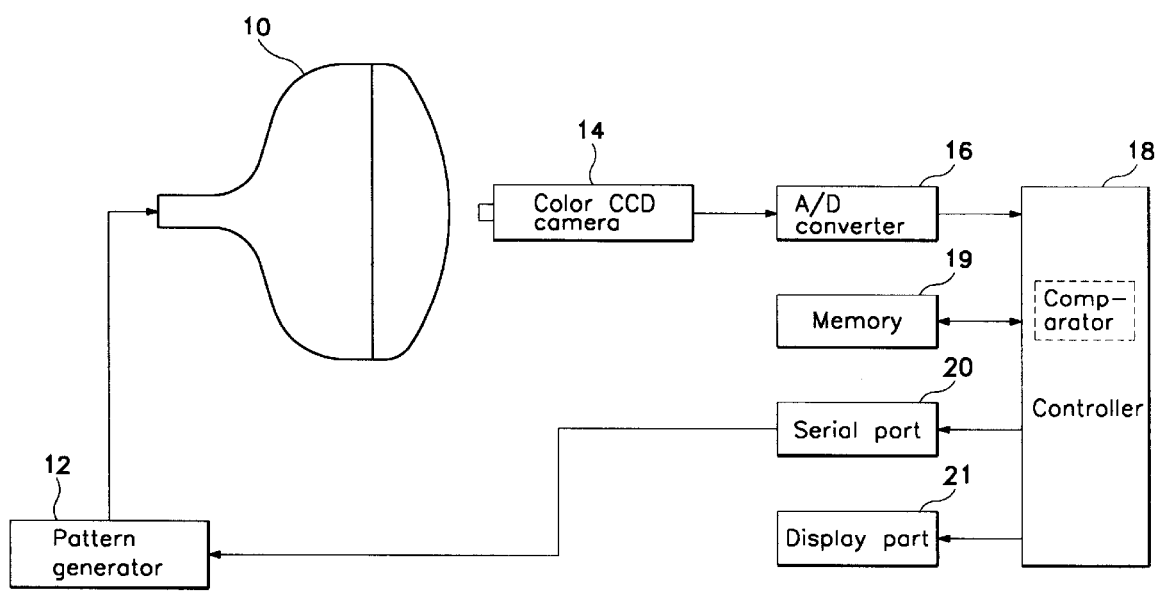
FIG. 2 is a schematic block diagram of a convergence measurement system for a color CRT in accordance with a preferred embodiment of the invention and including color CCD camera.

Preferred embodiments of the present invention will now be described in detail with reference to the accompanying drawings. As indicated above, FIG. 2 is a block diagram of a convergence measurement system for a color CRT. As shown in FIG. 2, in the illustrated convergence measurement system, a pattern generator 12 generates a signal used in displaying a test pattern on the screen of a color CRT 10, and a color CCD camera 14 photographs or images, i.e., produces an image of, the test pattern formed on the screen of the color CRT 10. Analog R(red), G (green), B (blue) brightness signals generated by the color CCD camera 14 are transmitted to an A/D converter 16 which converts the signals into R.G.B brightness signals that are then input to a controller 18.

The controller 18 classifies or recognizes the brightness value of each of the R.G.B signals as a grey level ranging from "0" to "255". The grey level determined by the controller 18 is nearer to "0" for the darker R.G.B signals, and nearer to "255" for the brighter R.G.B signals.

The controller 18 stores R.G.B brightness values of each input pattern in a memory 19. Each brightness value of the R.G.B signal is separately stored at another address in memory 19. The controller 18 then compares the stored R.G.B brightness values with a predetermined reference brightness value using a comparator indicated in FIG. 2 as being part of controller 18. If the R.G.B brightness values are identical to the predetermined reference brightness value, convergence is measured and displayed on a display unit or display part 21. If, however, the R.G.B brightness values are not identical to the predetermined reference brightness value, a corresponding control signal is supplied to the pattern generator 12 through a serial port 19, and the pattern generator 12 adjusts the intensity of each R.G.B signal of each pattern displayed on a color CRT 10 according to the control signal. Therefore, all patterns displayed on the screen are imaged with the same brightness value, and then convergence is measured.

It is noted that the reference brightness value is preferably determined to be within a level range from "150" to "240" in the grey level range from "0" to "255," a range that provides easy division between the R.G.B signals, i.e., enables discrimination between signals. In the most preferred embodiment of the present invention, the reference brightness value is determined as a grey level of "215."

Figure 1:
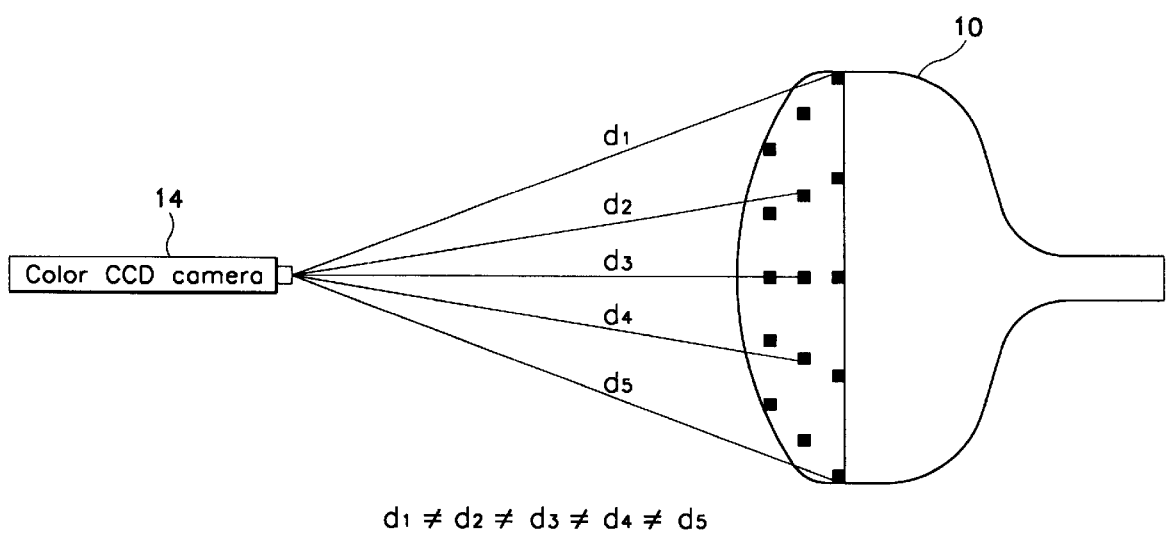
FIG. 1, which was described above, is a schematic diagram of a color CCD camera and a color CRT showing different distances between the color CCD camera and corresponding patterns displayed on the screen of the color CRT.
Figure 3A:
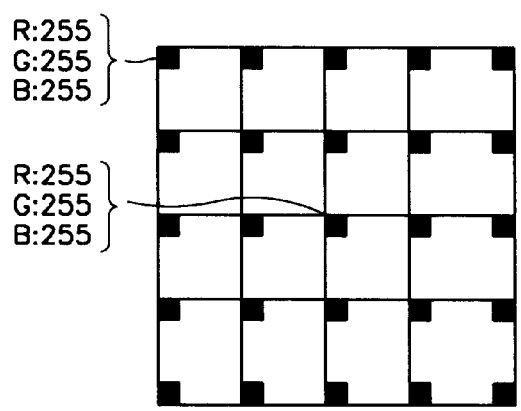
FIGS. 3A and 3B are image diagrams showing the brightness value variations among R.G.B signals of test patterns of a color CRT picked up by a color CCD camera, after adjusting brightness and before adjusting brightness.
Figure 3A:
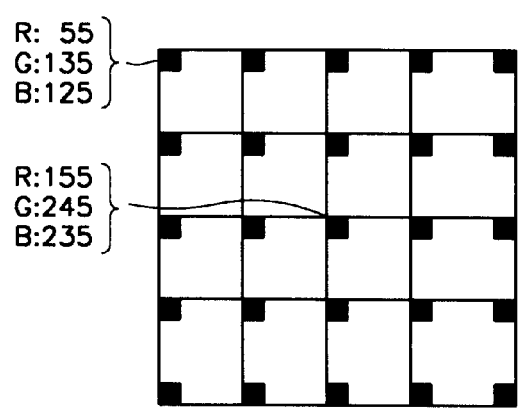

Referring to FIG. 3A, when the R.G.B brightness values of a central part of the pattern and a peripheral part of the pattern (which parts are displayed on the CRT screen with the same brightness prior to brightness regulation as shown at the top of FIG. 3A), are imaged by the color CCD camera 14 and are then input to the controller 18, the R.G.B brightness values of the central part of the pattern and the R.G.B brightness values of the peripheral part deviate from their original values as shown at the bottom of FIG. 3A because of differences in the distances between the color CCD camera 14 and the corresponding pattern on the screen of the color CRT 10. (As discussed above, these different distances are denoted d1 to d5 in the example shown in FIG. 1.)

Figure 3B:
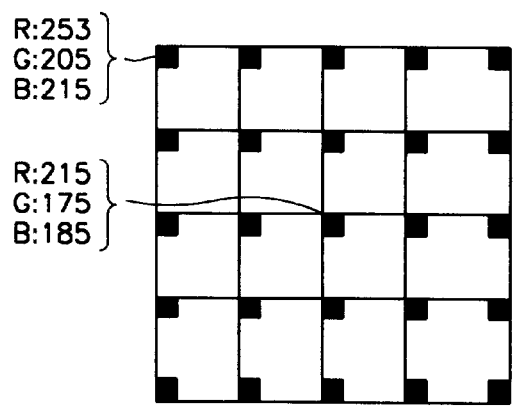
Figure 3B:
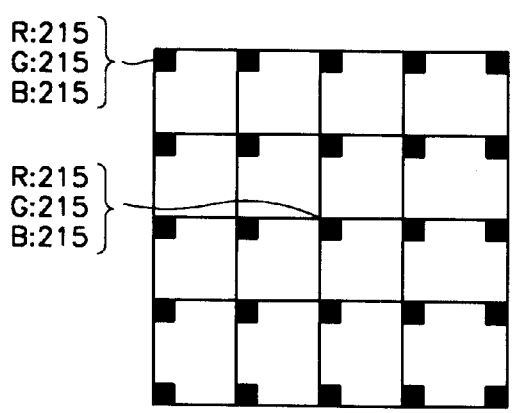

Referring to FIG. 3B, as is illustrated therein, after the intensity of each R.G.B signal is adjusted, as indicated at the top of FIG. 3B, using the system shown in FIG. 2, the controller 18 provides that the R.G.B brightness values of the images produced by the camera 14 are of a uniform value (a grey level of "215") as shown at the bottom of FIG. 3B.

Figure 4:
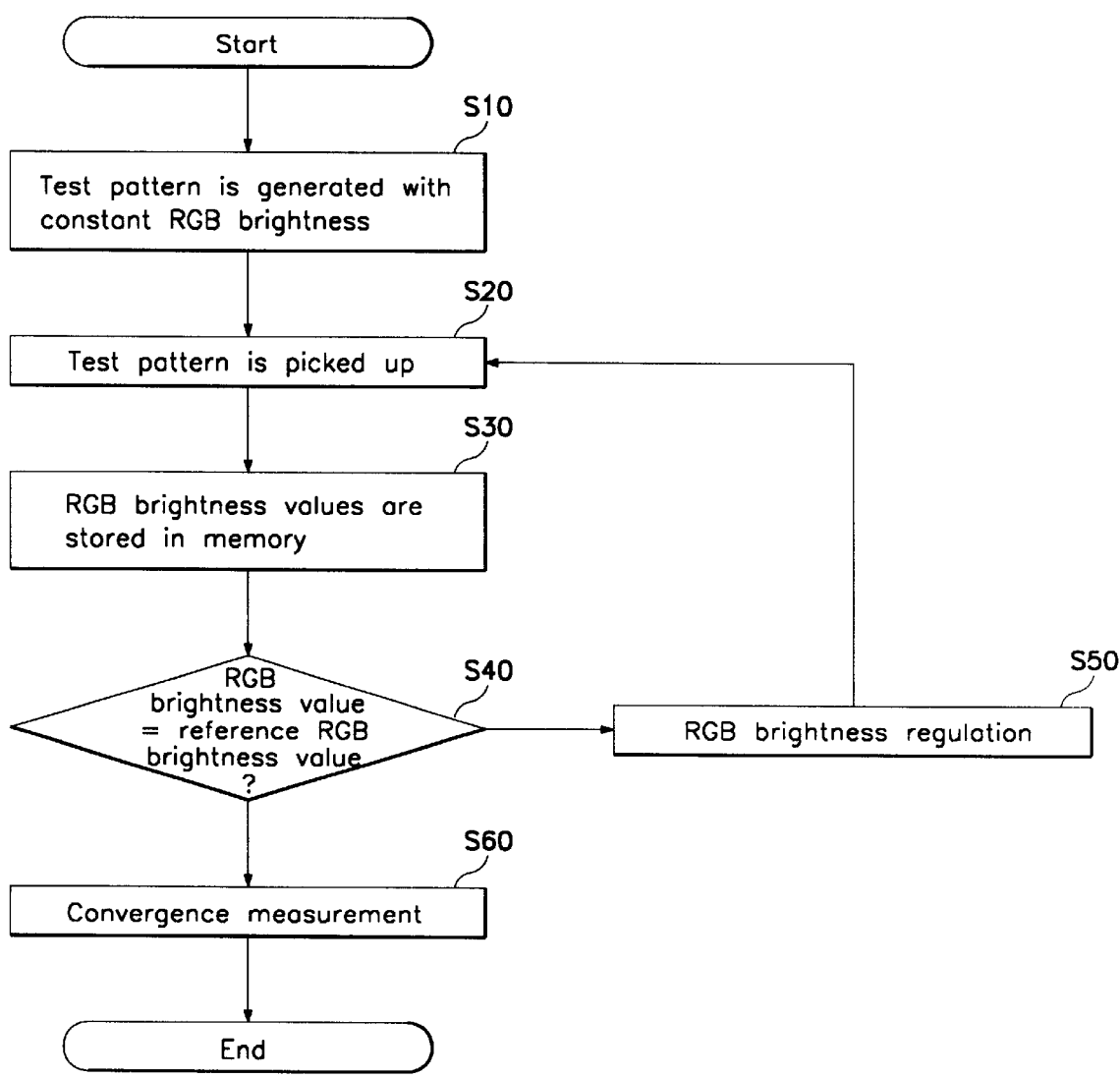
FIG. 4 is a flow diagram of a method for measuring convergence with respect to a color CRT using a color CCD camera, in accordance with a preferred embodiment of the method of the invention.

A method for measuring convergence of the color CRT will now be described with reference to FIG. 4. The method of FIG. 4 uses the apparatus of FIG. 2 and, as shown in FIG. 4, a large number of square-type test patterns are displayed (in step S10) on the screen of the color CRT 10 the convergence of which is to be controlled, using pattern generator 12. As shown in FIGS. 3A and 3B, the square-type test pattern is positioned so as to contact a crossing point of a cross-hatch pattern, and is positioned within the corresponding cross-hatch pattern area. At this time, because many of the test patterns displayed on the screen of the color CRT 10 have the same R.G.B signal intensity, the same R.G.B brightness values are displayed at all positions of the screen as shown in the upper portion of FIG. 3A. More specifically, in the preferred embodiment shown in FIG. 3A, the brightness values all have a grey level of "215."

Each test pattern having the same R.G.B brightness value is picked up (step S20) by the color CCD camera 14. As discussed above, the analog output R.G.B brightness values of the color CCD camera 14 are input to the A/D converter 16, are converted to digital signals, and are then input to the controller 18. As was also discussed above, the controller 18 stores (step S30) the R.G.B brightness values of each pattern in the memory 19. The brightness values of each of the R.G.B signals is stored separately in memory 19.

As indicated previously, in the aforementioned step, the R.G.B brightness values of a test pattern picked up by camera 14 are nonuniform as input to the controller 18 because of the different distances d1–d5 (see FIG. 1) between the color CCD camera 14 and the color CRT 10. Specifically, the R.G.B brightness values at the center part of the CRT screen are substantially different from the R.G.B brightness values at a peripheral part of the CRT (see lower portion of FIG. 3A).

As discussed hereinbefore, the controller 18 then compares the R.G.B brightness values of each pattern stored in memory 19 with a predetermined reference brightness value using the comparator of controller 18, and determines (in a step indicated by decision diamond S40) whether or not the stored R.G.B brightness values are identical to the predetermined reference brightness value.

If the R.G.B brightness values stored in memory 19 are not identical with the reference brightness value as determined by step S40, the controller 18 adjusts the intensity of electron beam generated from three electron guns (i.e., the R.G.B guns) by controlling the pattern generator 12, thereby adjusting (in step S50) the R.G.B brightness values of each pattern. As a result, the R.G.B signal intensities applied to the color CRT 10 from the pattern generator 12 now differ from each other, so that brightness values of R.G.B signals scanned on the screen of color CRT 10 are different, as shown in the upper portion of FIG. 3B. More particularly, as shown, by virtue of step S50, the R.G.B brightness values at the central part of the screen are relatively lower, and the R.G.B brightness values at the peripheral part of the screen are relatively higher.

In this method of adjusting the intensity of the R.G.B signals using the pattern generator 12, the R.G.B brightness values of all patterns picked up by the color CCD camera 14 can be made to be identically recognized or determined by the controller 18, irrespective of pattern position or the distance between the color CCD camera and the pattern, as shown in the lower portion of FIG. 3B.

If the R.G.B brightness values are identical with the reference brightness value in the step S40, convergence is measured (step S60) and is displayed on a display unit or part 21. At this point, the convergence control program is completed.

As described above, the color CRT convergence measuring system and color CRT convergence measuring method according to the present invention provide for adjusting the intensity of R.G.B signals generated from a pattern generator in order to ensure that all test patterns that are imaged have a uniform R.G.B brightness value at all positions of color CRT screen, irrespective of pattern position or distance differences in the distances between the color CCD camera and a respective pattern on the CRT screen. Therefore, convergence measurement errors associated with the prior art (which images test patterns with nonuniform R.G.B brightness) are prevented, and thus a more accurate convergence measuring operation is achieved.

It is to be understood by those skilled in the art that variations and modifications can be made to the preferred embodiments described above without departing from the scope and spirit of this invention. Accordingly, it is not intended that the scope of the claims appended hereto be limited to the description as set forth herein, but rather that the claims be construed as encompassing all of the features of patentable novelty that reside in the present invention, including all features that would be treated as equivalents thereof by those skilled in the art to which this invention pertains.

What is claimed is:

1. An apparatus for measuring convergence of R.G.B. beams of a color CRT, said apparatus comprising:

a pattern generator for generating a test pattern of R.G.B. signals on a screen of a color CRT;

a color CCD camera for imaging the test pattern formed on the screen of the color CRT to produce an imaged test pattern having R.G.B. brightness values;

a comparator for comparing the R.G.B brightness values of the imaged test pattern of the color CCD camera with a predetermined reference brightness value; and a controller for adjusting, in intensity, each of the R.G.B signals of the test pattern generated by the pattern generator so as to produce a uniform R.G.B brightness value when the R.G.B brightness values of the imaged test pattern are determined by said comparator to be different from said reference brightness value, and for thereafter measuring convergence, said controller controlling the pattern generator so as to adjust the intensity of the R.G.B signals of each test pattern in order to produce a uniform R.G.B brightness value for all test patterns, each test pattern contacting a crossing point of an overall cross-hatch pattern, being positioned within a respective discrete area defined by crossing lines of the cross-hatch pattern, and being of a square shape.

2. The apparatus according to claim 1, wherein:

the reference brightness value is within a level range from "150" to "240" that divides the R.G.B signals, in a grey level range from "0" to "255."

3. A method for measuring convergence R.G.B. signals of a color CRT, said method comprising the steps of:

generating a plurality of test patterns of R.G.B. signals on a screen of the color CRT, each of said R.G.B. signals having a constant R.G.B brightness value;

imaging the test pattern formed on the screen of the color CRT using a color CCD camera to produce an imaged test pattern having R.G.B. brightness values; and adjusting in intensity each of the R.G.B signals of the test pattern on the basis of the R.G.B brightness values of the imaged test pattern produced by the color CCD camera, and thereafter measuring convergence, said adjusting in intensity of the R.G.B signals comprising comparing R.G.B brightness values of an imaged test pattern with a predetermined reference brightness value, and adjusting in intensity the R.G.B signal of each pattern so as to produce a uniform R.G.B brightness value for all test patterns, each test pattern contacting a crossing point of an overall cross-hatch pattern, being positioned within a discrete area defined by crossing lines of the cross-hatch pattern, and being of a square shape.

4. The method according to claim 3, wherein:

the reference brightness value is within a level range from "150" to "240" that divides the R.G.B signals, in a grey level range from "0" to "255."

* * * * *